(12) United States Patent
McFarlane et al.

(10) Patent No.: US 7,425,584 B2
(45) Date of Patent: Sep. 16, 2008

(54) CATALYTIC DEVULCANIZATION OF RUBBER

(75) Inventors: Richard Anthony McFarlane, Edmonton (CA); Roger Kai Lott, Edmonton (CA); Haibo Huang, Edmonton (CA)

(73) Assignee: Alberta Research Council, Edmonton (CA)

(*) Notice: Subject to any disclaimer, the term of this patent is extended or adjusted under 35 U.S.C. 154(b) by 543 days.

(21) Appl. No.: 10/997,932

(22) Filed: Nov. 29, 2004

(65) Prior Publication Data

US 2006/0116431 A1    Jun. 1, 2006

(51) Int. Cl.
*C08J 11/04* (2006.01)

(52) U.S. Cl. .................. 521/41; 521/41.5; 521/42; 521/42.5; 521/43; 521/44.5

(58) Field of Classification Search .......... 521/41, 521/41.5, 42, 42.5, 43, 44.5
See application file for complete search history.

(56) References Cited

U.S. PATENT DOCUMENTS

| 4,161,464 | A | 7/1979 | Nicholas |
| 4,426,459 | A | 1/1984 | Watabe |
| 5,275,948 | A | 1/1994 | Straube et al. |
| 5,389,691 | A | 2/1995 | Cha |
| 5,578,197 | A | 11/1996 | Cyr |
| 5,597,851 | A | 1/1997 | Romine |
| 5,602,186 | A | 2/1997 | Myers |
| 5,672,630 | A | 9/1997 | Mouri |
| 5,770,632 | A | 6/1998 | Sekhar |
| 5,798,394 | A | 8/1998 | Myers |
| 5,891,926 | A | 4/1999 | Hunt |

FOREIGN PATENT DOCUMENTS

| CA | 2128253 | 1/1996 |
| CA | 2231514 | 5/1997 |
| WO | WO 99/48960 | 9/1999 |

OTHER PUBLICATIONS

International Search Report dated Feb. 28, 2006.
Written Opinion of the International Searching Authority dated Feb. 28, 2006.

*Primary Examiner*—Edward J Cain
(74) *Attorney, Agent, or Firm*—Hicks & Associates

(57) ABSTRACT

The present invention relates generally to the delulcanization of rubber. More specifically, the present invention relates to a process for the hydro-devulcanization of vulcanized rubber utilizing a rubber swelling solvent, a source of reactive hyrogen and elevated temperature and, optimally, also uses a dispersed molecular-scale hydrogenation catalyst that is introduced into the vulcanized rubber in a catalytically inert form that is soluable in the rubber swelling solvent.

31 Claims, 1 Drawing Sheet

CATALYTIC DEVULCANIZATION OF RUBBER

FIELD OF THE INVENTION

The present invention relates generally to the devulcanization of rubber. More specifically, the present invention relates to a process for the hydro-devulcanization of vulcanized rubber utilizing a rubber swelling solvent, a source of reactive hydrogen and elevated temperature and, optimally, also uses a dispersed molecular-scale hydrogenation catalyst that is introduced into the vulcanized rubber in a catalytically inert form that is soluble in the rubber swelling solvent.

BACKGROUND OF THE INVENTION

Rubber tires are composite materials consisting of different rubber polymers, which have been blended with a variety of additives including sulphur and carbon blacks. During manufacture, polymers are layered with reinforcing fabrics and cords made from fibreglass, polyester and steel and are assembled and compressed into a basic shape called a green tire. This green tire is then cured at a specified temperature for a specified time.

The curing process, known as vulcanization, causes sulphur to crosslink with the various rubber polymer chains to form a three-dimensional network that results in a thermoset polymer. Thermoset polymers are contrasted with thermoplastic polymers such as polyethylene, polystyrene and polyvinylchloride which can be softened and reshaped by the use of heat or by dissolving the polymer in a suitable solvent. Whereas a thermoplastic polymer can be dissolved within a solvent that enables the polymer to be cast as a polymer solution with the solvent subsequently evaporated to re-form a solid polymer, thermoset polymers are infusible and insoluble and cannot be reshaped once formed and cured.

As a result, with used vulcanized rubber products, and particularly products such as worn rubber tires, reuse and recycling is problematic as the vulcanized rubber cannot be fused and reshaped nor dissolved in a solvent for recasting into a new shape as is possible with thermoplastic polymers.

In past attempts to re-use or recycle used rubber tires, reshaping of used rubber tires into new products has been accomplished by cutting or grinding the rubber tire to produce strips of rubber or crumb of a suitable size that can be used as building blocks or aggregate which, when combined with bonding agents such as resins, can be formed into new shapes. While a variety of innovative products have been created by this methodology, this approach has provided only a limited outlet for recycling used tires.

Other methods to efficiently dispose of or re-use discarded tires have also been explored. For example, used rubber tires have been shredded and reused to make other products such as rubber mats, padding materials, or asphalt additives. In addition, processes for co-recycling rubber tires with other materials have been described (see for example U.S. Pat. No. 5,389,691). Used tires have also been used as thermal fuel which is generally not desirable for environmental reasons due to the atmospheric emissions that result from burning vulcanized rubber. Exceptions to this include use of tires to fuel cement kilns and for carbon addition to steel making.

Further still, there have been attempts to soften rubber tires using high temperatures and/or pressures. For example, U.S. Pat. No. 5,672,630 to Mouri describes a method to soften vulcanized rubber by kneading it with unvulcanized new rubber at high temperatures. However, this process does not result in a truly devulcanized rubber product.

Thus, despite the many recycling/reuse initiatives, it is estimated that each year in the U.S., there are upwards of 200 million tires that are stranded without an end use or that are used as thermal fuel.

As a result, and due to the ever-increasing numbers of tires and the growing awareness of environmental issues, it remains desirable to find methods to devulcanize vulcanized rubber such that the devulcanized rubber can be cast into new products including new tires. More specifically, it has been desirable to develop devulcanization processes that remove the sulphur crosslinks within the vulcanized rubber, resulting in breakdown of the three-dimensional polymer network and the production of polymers that can be fused and reshaped into new products such as tires.

Past methodologies to devulcanize rubber have included various approaches, some of which are discussed below. For example, U.S. Pat. No. 5,891,926 to Hunt describes a process including heating vulcanized rubber in the presence of 2-butanol under high pressure.

Other processes claim to remove or reduce the sulphur crosslinking within rubber tires. These processes include microwave treatment, ultrasonic treatment, milling with additives, and chemical processing. These approaches to devulcanization of rubber tires have, however, proved difficult and inefficient. Common problems include poor removal of crosslinks, thermal cracking which degrades the rubber polymers, and high temperature and pressure requirements.

Most importantly, however, the major limitation in past devulcanization techniques is overcoming the inherent mass transfer limitations in reacting the solid rubber crumb with an agent effective in removing the sulphur crosslinks. In other words, as the devulcanization is initiated at the outside surface of the rubber crumb, the reaction is very slow unless the size of the crumb is exceedingly small. Attaining small rubber crumb is costly and the process can mechanically degrade the rubber polymers. Furthermore, the slow reaction rate also leads to thermal cracking of the polymer, which reduces the molar mass of the devulcanized polymer, thereby degrading the mechanical properties of the devulcanized rubber, and also producing light hydrocarbon gaseous products. Thermal cracking may also lead to condensation reactions, which increase the polymer molar mass and can lead to the formation of solid coke which can be detrimental to the properties of new materials made from the devulcanized rubber In other examples, U.S. Pat. Nos. 5,798,394 and 5,602,186 to Myers describe a method to devulcanize rubber crumb using metallic sodium. In this method, the rubber crumb is first slurried with a solvent such as cyclohexane or toluene to swell the rubber crumb. Alkali metal is then added as the devulcanization agent. The reaction is carried out in the absence of oxygen and in the presence of hydrogen, requiring a two-fold stoichiometric excess of sodium with respect to sulphur content of the rubber. Temperatures and pressures sufficient to form molten sodium are used. Moreover, the reaction system includes four phases with inherent mass transfer limitations. In this process, reactions of the sulphur crosslinks with the sodium metal, which is a liquid at reaction conditions, can only occur at the external surface. There is no efficient mass transfer of molten sodium into the three-dimensional polymer network where it can react with the sulphur crosslinks.

U.S. Pat. No. 4,161,464 to Nicholas describes the devulcanization of rubber particles following swelling of the rubber particles with an organic solvent containing a dissolved onium salt. This slurry is then contacted by an alkali solution. The onium salt exchanges its anion for a hydroxyl anion at the interface between the organic solution and the aqueous alkali solution. The onium salt, carrying the hydroxyl anion, can diffuse to the crumb and within the crumb, the hydroxyl anion can react with sulphur. The swelling of the rubber by the organic solvent is said to facilitate permeation by onium hydroxide pairs. Once the hydroxyl anion reacts, the onium salt must re-diffuse to the organic-aqueous interface and re-exchange its anion for another hydroxyl anion prior to another diffusion and reaction cycle U.S. Pat. No. 4,426,459 to Watabe also discusses swelling vulcanized rubber with a solvent, followed by reaction with an organic hydroperoxide, a salt or organometallic compound of an element taken from the first transition series of the periodic table of elements and a strong base. Treatment is carried out in an aerobic environment at temperatures between 0° C. and 100° C. U.S. Pat. No. 5,770,632 to Sekhar describes a process in which one or more so-called delinking accelerators is combined with zinc oxide to delink sulphur-cured rubber and open up the vulcanized network.

U.S. Pat. No. 5,275,948 to Straube reports the utilization of chemolithotropic microbes in an aerobic environment to release sulphur from vulcanized rubber as elemental sulphur and sulphuric acid. The rubber crumb is preferably finely ground to 50-350 microns. Straube teaches that it is sufficient to devulcanize the rubber crumb in this way to a depth of a few micrometers, i.e, the rubber crumb is devulcanized at the surface. Similarly, Romine and Snowden, in U.S. Pat. No. 5,597,851, teach the use of thiophyllic microbes or enzymes from thiophyllic microbes for conversion of sulphur crosslinks in vulcanized rubber to sulphoxides and sulphones. Romine also teaches that only the sulphur crosslinks exposed on the surface of the rubber crumb need be converted in this manner. The approach proposed by Romine provides a surface modified rubber crumb. Neither the approach taught by Romine nor Straube would lead to products that could be fused and reshaped into new rubber products in the same manner as the original unvulcanized rubber polymers.

The various devulcanization processes have drawbacks limiting their use on a large scale. Some chemical and biochemical processes appear capable of devulcanizing rubber but either devulcanize only a superficial layer on the rubber crumb or are inefficient. The inefficiencies may be due to significant mass transfer limitations caused by the reaction occurring only on the external surface of the crumb or by reactants that must be continuously transferred from solution into the solid crumb. An additional concern with some of these chemical processes is that they require relatively high temperatures. The use of high temperatures combined with mass transfer limited reactions lead to greater opportunity for thermal degradation reactions to occur. Thermally degrading reactions can shorten the length of rubber polymer chains or otherwise change their chemical structures such that their mechanical properties are adversely affected, thus limiting their usage in new rubber products.

In other technologies unrelated to devulcanization, certain compounds or catalysts have been used to remove or modify sulphur linkages within various chemical entities. Such a reaction is described in U.S. Pat. No. 5,578,197 to Cyr, which discloses the addition of an oil-soluble metal compound to petroleum feedstock, which under prescribed conditions is converted to a metal sulphide catalyst. The catalyst, in the presence of hydrogen, is useful for hydrocracking the feedstock and removing sulphur as hydrogen sulphide. Other such processes are well known in the petroleum refining industry where sulphur removal is a requirement for converting crude oil to consumer products such as fuels and lube oils In view of the foregoing problems, it is therefore, desirable to provide improved methodologies to efficiently and effectively devulcanize used rubber to enable its effective re-use.

SUMMARY OF THE INVENTION

It is an objective of the present invention to obviate or mitigate at least one disadvantage of previous devulcanization processes.

In accordance with the invention, there is provided a process for the devulcanization of rubber comprising the steps of:
  a) contacting vulcanized rubber with a rubber-swelling solvent capable of swelling the rubber to form solvent-swollen vulcanized rubber;
  b) heating the solvent-swollen vulcanized rubber in the presence of a hydrogen source to initiate a devulcanzation reaction; and
  c) allowing the devulcanization reaction to proceed for a time sufficient to effectively devulcanize the vulcanized rubber, In accordance with another embodiment step a) includes contacting vulcanized rubber with a hydrogenation catalyst precursor dissolved in the rubber-swelling solvent to form solvent-swollen vulcanized rubber containing the hydrogenation catalyst precursor; and step b) includes heating the solvent-swollen vulcanized rubber to convert the catalyst precursor to an active catalyst in the presence of the hydrogen source to initiate the devulcanzation reaction. In various embodiments, the rubber-swelling solvent is preferably inert with respect to reaction with the catalyst precursor, active catalyst and vulcanized and devulcanized rubber and/or the catalyst precursor is soluble in the swelling solvent.

In a preferred embodiment, the catalyst precursor is an organometallic compound of a transition metal. More specifically, the catalyst precursor may be an organometallic compound, $M-R_x$, where M is a transition metal and $R_x$ is an organic ligand having any one of or a combination of a carbonyl, naphthenate, carboxylate, phosphine, amine, nitrosyl, or cyclopentadienyl group.

In more specific embodiments, the catalyst precursor may be any one of or a combination of molybdenum ethylhexanoate, molybdenum carbonyl, molybdenum naphthenate, nickel carbonyl, nickel naphthenate, cobalt carbonyl, cobalt naphthenate, iron carbonyl, ruthenium carbonyl, tungsten carbonyl and osmium carbonyl.

In a still further embodiment, the vulcanized rubber may be incubated with the solvent prior to contact with the catalyst precursor and/or may be incubated with the swelling solvent for a time sufficient to effect saturation of the swelling solvent within the vulcanized rubber.

In a preferred embodiment, in step a), the catalyst precursor is mixed with the swelling-solvent, and the vulcanized rubber is then contacted with the solvent/precursor mixture. It is also preferred that the process is carried out in a controlled anaerobic, reducing atmosphere within a batch or continuous flow reactor.

Steps b) and c) of the process are preferably performed at a temperature of 50-450° C. and more preferably at 50-250° C. The reaction time of steps b) and c) is preferably less than 180 minutes and more preferably less than 90 minutes.

In various embodiments, the hydrogen source may be any one of or a combination of hydrogen gas, decalin, tetralin, or a hydroaromatic compound.

In yet another embodiment, step a) includes adding a sulphiding agent for activating the catalyst precursor such as dimethyldisulphide.

In a further embodiment, the process may include the step of quenching the reaction after step c).

Still further, in another embodiment, the process may include the step of separating unreacted vulcanized rubber and carbon black from the devulcanized rubber.

The invention also provides a process of controlling the molar mass of the devulcanized rubber by adjusting the reaction time of step c) and the upper temperature of step b).

In a further embodiment, the invention provides a process for devulcanizing rubber comprising contacting and heating an amount of vulcanized rubber with an effective amount of a rubber swelling solvent and a hydrogenation catalyst precursor soluble in the solvent.

Still further, the invention provides a monophasic devulcanization solution comprising a hydrogenation catalyst precursor and a rubber swelling solvent.

In yet another embodiment, the invention provides a rubber-swelling solvent and an organo-transition metal catalyst precursor in solution for use in the devulcanization of vulcanized rubber in an anaerobic environment in the presence of a hydrogen source.

In still yet another embodiment, the invention provides a rubber devulcanization process comprising the steps of:
a) contacting vulcanized rubber with a mixture of a hydrogenation catalyst precursor and a rubber swelling solvent;
b) activating the hydrogenation catalyst precursor with heat and a source of sulphur to cause devulcanization in the presence of reactive hydrogen.

In a still further embodiment, the invention provides a rubber devulcanization process comprising the steps of converting a catalyst precursor, $M\text{-}R_x$, where M is a transition metal and $R_x$ is an organic or other ligand capable of coordination with the transition metal in a charged or uncharged state, to an active catalyst by reaction of the catalyst precursor with sulphur within solvent-swollen vulcanized rubber, $R'\text{—}S_z\text{—}R''$, where R' and R'' are rubber polymers or rubber polymer additives and $\text{—}S_z\text{—}$ are sulphur crosslinks within the vulcanized rubber and wherein the reaction is carried out in the presence of reactive hydrogen.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figure, wherein.

DETAILED DESCRIPTION

Figure 1:
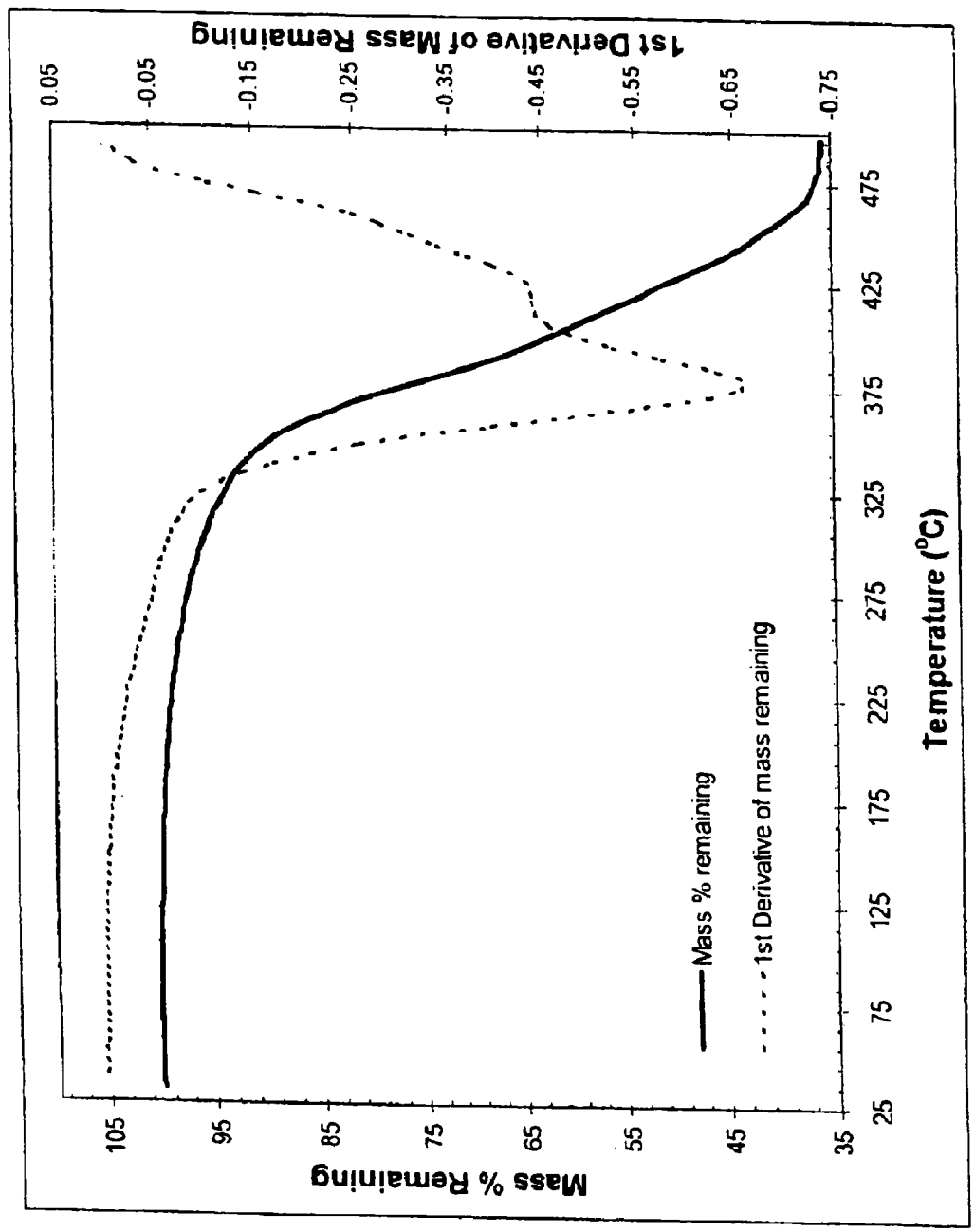
FIG. 1 is a graph showing a temperature-programmed gravimetric analysis of rubber crumb and indicating the onset of thermally degrading reactions.

The present invention provides methods for devulcanizing rubber. In accordance with a preferred method of the invention, a swelling solvent is imbibed into the rubber crumb, and a solvent-soluble hydrogenation catalyst precursor is imbibed into the core of the crumb along with the swelling solvent. Upon heating this mixture, the catalyst precursor is converted to an active catalyst through contact and reaction with any of the forms of sulphur normally present in vulcanized rubber including elemental sulphur, sulphur in crosslinks or organo-sulphur compounds. When a source of chemically reactive hydrogen, such as hydrogen dissolved in the organic solvent or hydroaromatic compounds, is available a hydro-devulcanization reaction takes place simultaneously at the surface and throughout the interior of the rubber crumb. The capability for the reaction to occur both at the internal core and external surface of the rubber crumb reduces the mass transfer limitations normally associated with the devulcanization of rubber crumb.

The solvent and catalyst precursor are preferably chosen such that the solvent will cause swelling of the rubber crumb and will carry the catalyst precursor into the interior of the rubber crumb. It is preferable that the catalyst precursor be soluble in the swelling solvent. The solvent is preferably one which will not degrade irreversibly or adversely react under devulcanization conditions. In one embodiment, the solvent is one that is capable of donating hydrogen, such as hydroaromatic compounds, for the devulcanization reaction. The solvent may be selected to react under devulcanization conditions to produce a co-product with the devulcanized rubber.

The conversion of the catalyst precursor, $M\text{-}R_x$ (where $R_x$ can represent any number and variety of organic functionalities or other ligands capable of coordination with a transition metal, M, in a charged or uncharged state including but not limited to carbonyls, naphthenates, carboxylates, phosphines, amines, nitrosyls, and cyclopentadienyls) to the active catalyst by reaction with, for example, elemental sulphur, followed by reaction with the vulcanized rubber polymers ($R'\text{—}S_z\text{—}R''$, where R' and R'' represent polymers or polymer additives and $S_z$ represents the sulphur crosslinks) in the presence of reactive hydrogen, for example hydrogen gas, can be represented by Reactions (1) and (2).

Reaction (1)

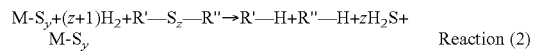

Reaction (2)

In Reaction (1) the catalyst precursor ($M\text{-}R_x$) is an organometallic compound soluble in a solvent capable of swelling the rubber crumb. After heating the mixture to a specified temperature, the organometallic is converted to a metal sulphide to form an active catalyst ($M\text{-}S_y$) by reaction with sulphur (S), present in the crumb. As noted above, various forms of sulphur including elemental and/or organic sulphur compounds such as those present in vulcanized rubber can also convert the catalyst precursor to the active form. Non-limiting examples of suitable catalyst precursors include molybdenum carbonyls, molybdenum naphthenates, nickel carbonyls, nickel naphthenates, cobalt carbonyls, cobalt naphthenates, iron carbonyls, ruthenium carbonyl, tungsten carbonyl and osmium carbonyl.

At the same or a different temperature from that in Reaction (1), the active catalyst, formed inside the rubber crumb, promotes Reaction (2) whereby dissolved hydrogen gas ($H_2$) or other sources of reactive hydrogen reacts with the sulphur including the sulphur crosslinks within the vulcanized rubber and converts the sulphur to hydrogen sulphide gas thereby rupturing the sulphur crosslinks. The catalyst ($M\text{-}S_y$) is unaltered by participation in the reaction and is then available to react with other sulphur crosslinks in the rubber crumb. The process effectively unzips the crumb and opens up the three dimensional polymer network for further reaction until the devulcanization process has been completed to the desired level.

An alternative reaction pathway which is thermally initiated is represented by Reactions (3) and (4).

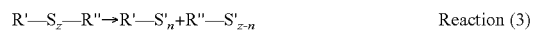

Reaction (3)

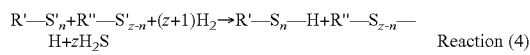

Reaction (4)

Reaction (3) represents breakage of the sulphur linkages, the weakest chemical bond in the vulcanized rubber, by the application of heat alone to produce sulphide radicals. These radical are highly reactive and can follow a number of possible reaction pathways. One possible reaction pathway involves reaction with dissolved hydrogen to form sulphides as shown in Reaction (4). Reaction (4) represents the ideal situation, for thermal reaction, whereby devulcanization occurs without any degradation of the polymer. Other reaction pathways involving □-elimination or condensation reactions are possible which could lead to degraded or higher molecular mass products, respectively.

EXAMPLES

Several embodiments of the catalytic devulcanization process are described in the following examples, a 1 L batch autoclave equipped with a mechanical stirrer and temperature controller was used.

To ensure a consistent particle size for the rubber crumb used in these tests, the crumb was dry sieved and narrow size cuts were collected for testing. A batch of rubber crumb with a nominal particle size 850 to 2000 microns (20 to 10 mesh) was obtained from a local supplier. The rubber crumb was derived from dry grinding whole passenger tire with metal and fibres subsequently being removed. The results of the dry screening of the crumb are summarized in Table 1. The sub-fractions selected for use in testing consisted of crumb having particle sizes between 1400 and 1700 microns. The average particle size for the crumb was 1541 microns. Analysis of these selected sub-fractions by ASTM D 5142 indicated that the percentage of volatiles was 65.1 wt. % and this was taken to be representative of the amount of reclaimable rubber polymer. Fixed carbon of 28.9 wt. % was taken as corresponding to the amount of carbon black in the crumb. The remaining 6.0 wt. %, ash, was taken as representative of inorganic material.

TABLE 1

Dry sieving results for rubber crumb.

| Mesh | Size (microns) | Fraction (wt. %) |
|---|---|---|
| 9 | 2000 | 0.87 |
| 10 | 1700 | 23.65 |
| 12 | 1400 | 26.78 |
| 13 | 1000 | 28.74 |
| 24 | 710 | 17.54 |
| 32 | 500 | 2.20 |
| <32 | <500 | 0.21 |

In order to estimate the lowest temperature for thermal cracking of the polymer components in the crumb, temperature programmed gravimetric analysis (TGA) was conducted on the rubber crumb (FIG. 1) using a Mettler Toledo TGA/SDTA 851. The TGA showed that significant mass loss does not occur until the temperature is above 200° C. and the major mass loss occurs above 300° C. First and second derivative analyses of the data indicated that the maximum changes in mass occur at 275° C. and 386° C. The lower temperature peak mass loss can correspond to loss of low molar mass additives as well as to facile cracking of the rubber polymer and additives. The higher temperature peak in mass loss corresponds to cracking of the rubber polymer backbone. Thermal cracking reactions involving the production of gas and a decrease in crumb mass constitute reactions that degrade the rubber polymer by shortening the polymer chain length or otherwise altering the chemical structure, and are undesirable. Temperature was continuously increased during the TGA analysis and thermal reactions also may have occurred at lower temperature but so slowly that they were not observable within the accuracy of the measurement. In view of the forgoing, it is preferred that the devulcanization reaction in accordance with the invention be restricted to a maximum temperature in the order of 250° C. and reaction times should be as short as possible (typically less than 90 minutes).

Swelling Solvent

The swelling solvent should be selected on the basis of solvency for devulcanized rubber, ability to swell vulcanized rubber and, ease of recovery from the devulcanized rubber. The solvent should be stable and inert to reaction with the catalyst and hydrogen so as not to adversely affect the devulcanization reaction. Furthermore, in some embodiments, it is desirable that the solvent be able to chemically transfer hydrogen to the catalyst or rubber polymer to carry out the devulcanization reaction by the solvent being hydrogenated by dissolved hydrogen and then subsequently transferring hydrogen, via dehydrogenation reactions to the reactants.

Crumb swelling was assessed using modified ASTM D720-91 procedures. A known mass of crumb was soaked in the solvent at 22° C. for one hour. While minimizing passage of air through the sample, the slurry was quickly filtered to remove free solvent and then weighed. The solvent swelling index was the mass increase in crumb, caused by uptake of solvent, divided by the initial mass of crumb. Since solvent was being used to imbibe the catalyst precursor, the volume of solvent taken up by the crumb was important. Therefore, a volume-swelling index was defined as swelling index divided by solvent density. In all cases, if the required amount of solvent capable of swelling the crumb was added, the solvent was taken up in about a minute so that the rubber crumb increased in volume and the surface of the crumb no longer appeared wet. The results are summarized in Table 2.

TABLE 2

Solvent swelling index of rubber crumb.

| | Solvent Properties | | Swelling Index | |
|---|---|---|---|---|
| Solvent | Boiling Point (° C.) | Density (g/mL) | (g-solvent/ g-crumb) | (mL solvent/ g-crumb) |
| Toluene | 110.8 | 0.866 | 3.26 | 3.76 |
| o-xylene | 144 | 0.881 | 3.33 | 3.78 |
| p-xylene | 138.5 | 0.861 | 3.12 | 3.62 |
| Dodecane | 214.5 | 0.751 | 1.99 | 2.66 |
| n-heptane | 98.4 | 0.684 | 1.86 | 2.72 |
| Cyclohexane | 81 | 0.779 | 2.90 | 3.73 |
| Tetralin | 206 | 0.973 | 3.81 | 3.92 |
| Decalin | 185.3 | 0.872 | 3.59 | 4.12 |

Examples 1-4

All tests were performed with 50 g of rubber crumb, 300 g of solvent and 200 ppm catalyst precursor (relative to crumb plus solvent, on a catalyst metal basis). The catalyst precursor used was in the form of molybdenum ethylhexanoate (Moly ET-HEX, OMG Americas) containing 14.85 wt. % molybdenum. In order to ensure activation of the catalyst remaining in that portion of the solvent not imbibed by the crumb, dimethyldisulphide (DMDS) was also added as a source of sulphur in a mass ratio of 9 parts DMDS to 2 parts of as received catalyst precursor.

For Examples 1 through 4, 300 g of solvent was added to the batch reactor at 22° C. The molybdenum ethylhexanoate (0.472 g) was mixed with the solvent followed by admixing 0.105 g of DMDS. Once these three components were well mixed, 50 g of rubber crumb was added to the reactor. The reactor was sealed and all oxygen displaced by purging with nitrogen gas. The reactor was purged and pressure tested for leaks first with 1500 psia nitrogen gas and then with 1500 psia hydrogen gas. Finally, the reactor was charged with hydrogen to a pressure of 342 psia. The reactor was heated from ambient to the reaction temperature of 250° C. in about 45 minutes (5.1° C./min). The reaction temperature was maintained to within 2° C. of the set point for 90 minutes. After this period, the reactor contents were rapidly cooled to quench the reaction. Once the reactor contents were recovered, high-speed centrifugation or filtration was used to remove unreacted rubber and carbon black followed by solvent evaporation to recover the dry sticky rubber polymer. Polymer yield was repeatable at +/−1.7% while repeatability in molar mass was +/−4000 grams per mole.

The results from each test are summarized in Table 3. The overall mass balance for an acceptable run was greater than 98%. It should be noted that the yield of devulcanized polymer is given as a weight percent of the volatiles in the initial rubber crumb (65.1 wt. % of crumb) determined by ultimate analysis and was taken as representing the total amount of rubber polymer in the crumb.

TABLE 3

Summary of results from devulcanization tests at 250° C. for 90 minutes

| Example | Solvent | Polymer Yield (wt. % of volatiles) | Molar Mass (g/mole) |
| --- | --- | --- | --- |
| 1 | n-heptane | 75.3 | 39507 |
| 2 | p-xylene | 80.2 | 44705 |
| 3 | decalin | 80.7 | 43074 |
| 4 | toluene | 86.4 | 37830 |

These results indicate that the choice of solvent affected the yield of devulcanized polymer. The impact of the solvent relates to the volume swelling index and also the solubility of the devulcanized polymer in the solvent. The yield of devulcanized polymer was lowest with n-heptane that has a volume-swelling index much lower than that for p-xylene, decalin or toluene. Molar mass of the devulcanized product was determined for these products by gel permeation chromatography (GPC) in 1,2,4 trichlorobenzene at 145° C. The GPC analysis showed two main molar mass peaks. One peak at 420 grams per mole was attributed to organic additives included during initial vulcanization of the rubber for tire production while the second peak at high molar mass was attributed to the devulcanized rubber. The rubber crumb feed was insoluble in 1,2,4 trichlorobenzene. At the conditions employed, the choice of solvent had little or no affect on the molar mass of the devulcanized polymer from devulcanization.

Examples 5-7

The effect of reaction time at constant temperature is illustrated by the following examples where the devulcanization was carried out in toluene using the same amounts of solvent, catalyst precursor, DMDS, hydrogen gas and rubber crumb as in Examples 1 to 4 with the reaction time varied from 30 to 90 minutes. The results summarized in Table 4 show that as the reaction time in toluene decreased from 90 to 30 minutes, the yield of devulcanized rubber decreases slightly. The results also show that for reactions at 250° C. in toluene, a reaction time of 60 minutes, or less, results in a significantly higher molar mass for the devulcanized polymer than reaction at the same temperature for 90 minutes. These data indicate the extent to which thermal degradation might be occurring, and would lead to cracking of the polymer chains and reduction in molar mass. The results also show that a relatively short reaction time of 30 minutes at 250° C. was sufficient to devulcanize 80% of the polymer in the rubber crumb while minimizing thermal degradation.

TABLE 4

Yield and molar mass of devulcanized rubber versus reaction time at 250° C.

| Example | Reaction Time (minutes) | Polymer Yield (wt. % of volatiles) | Molar Mass (g/mole) |
| --- | --- | --- | --- |
| 5 | 30 | 80.5 | 51351 |
| 6 | 60 | 80.2 | 51252 |
| 7 | 90 | 86.4 | 37830 |

Examples 8-10

The effect of reaction temperature is shown by the following examples with a reaction time of 60 minutes and with reaction temperatures of 200, 225 and 250° C. in toluene. The amounts of reactants used were the same as in Examples 1 to 7. The results in Table 5 show that changes in reaction temperature strongly affect the yield of devulcanized polymer. The yield approximately doubles when the reaction time was 60 minutes and the reaction temperature was increased from 200 to 250° C. There was no significant effect on molar mass of the devulcanized rubber.

TABLE 5

Yield and molar mass of devulcanized rubber versus reaction temperature for a constant reaction time of 60 minutes in toluene

| Example | Reaction Temperature (° C.) | Polymer Yield (wt. % of volatiles) | Molar Mass (g/mole) |
| --- | --- | --- | --- |
| 8 | 200 | 36.9 | 45688 |
| 9 | 225 | 64.4 | 45216 |
| 10 | 250 | 80.2 | 51252 |

Example 11

Dimethyldisulphide (DMDS) was used in the above examples to provide a source of sulphur to activate the catalyst precursor, which was not imbibed by the rubber crumb. This example shows that the addition of DMDS was not required. Apart from the absence of DMDS, the test was conducted in toluene using the same amounts of reactants as in Examples 1 to 10. The reaction was carried out at 250° C. for 60 minutes. The yield of devulcanized polymer was 86.2% and was comparable to a yield of 80.2% when DMDS was used in Example 10. The molar mass of the devulcanized polymer obtained without DMDS was 45,058 grams per mole compared with 51,252 grams per mole when DMDS was used in Example 10 (Table 6). These results demonstrate that an external sulphiding agent is not required for activating the catalyst because the vulcanized rubber can provide the sulphur required to convert the catalyst precursor to the active catalyst.

TABLE 6

Yield and molar mass of devulcanized rubber
with and without added DMDS after reaction
at 250° C. for 60 minutes in toluene.

| Example | DMDS Added | Polymer Yield (wt. % of volatiles) | Molar Mass (g/mole) |
|---|---|---|---|
| 10 | Yes | 80.2 | 51252 |
| 11 | No | 86.2 | 45058 |

Example 12

This example illustrates the advantage of adding a hydrogenation catalyst (Table 7). This test was carried out in toluene at 250° C. for 60 minutes using the same amounts of reactants as in Examples 1-4 except that no catalyst or DMDS was added. The yield of devulcanized polymer in this example was 77.9% and while this is similar to the yield of 80.2% achieved when the catalyst and DMDS were used under similar conditions employed in Example 10, the molar mass of the devulcanized rubber was significantly lower than that obtained using a catalyst and DMDS. This indicates that the catalyst was effective in reducing the extent of degradation of the polymers in the devulcanized product. However, it must be noted that the quality, in terms of extent of polymer degradation, of the devulcanized product produced without the addition of a dispersed hydrogenation catalyst may be adequate for a range of less demanding recycled rubber applications.

TABLE 7

Effects on yield and molar mass of devulcanized
rubber for reaction at 250° C. for 60 minutes
in toluene when neither catalyst nor DMDS was included.

| Example | Catalyst Added | DMDS Added | Polymer Yield (wt. % of volatiles) | Molar Mass (g/mole) |
|---|---|---|---|---|
| 10 | Yes | Yes | 80.2 | 51252 |
| 12 | No | No | 77.9 | 37508 |

Examples 13-14

These examples demonstrate that true devulcanization can be achieved without significant degradation of the polymers and that the molar mass of the rubber polymers in devulcanized product was substantially the same as that which went into producing the vulcanized rubber. For these examples, a model tread compound containing no carbon black was prepared according to the recipe shown in Table 8. This compound was formed into sheets of green rubber, which were then vulcanized. The vulcanized rubber sheets were cut into cubic particles about 2 millimetres in size. Samples (50 g each) of this vulcanized rubber were devulcanized using the same amounts of reactants as in Examples 1 to 4. In Example 13, the devulcanization was carried out at 250° C. for 90 minutes while for Example 14, devulcanization was carried out at 200° C. for 60 minutes. The yield and molar mass from these tests are summarized in Table 9. For reaction at 250° C. for 90 minutes, the yield of devulcanized polymer was 98.9% of the initial rubber charge indicating that the entire polymer in the vulcanized rubber was recovered. Insoluble and unreacted sulphur could account for the 1.1% of unrecovered material since this would have been removed as sediment during centrifugation of material recovered from the reactor. Reaction at 200° C. for 60 minutes gives a lower yield of devulcanized polymer, 35.6% which is similar to that in Example 8 of 36.9%. The product slurry from Examples 13 and 14 was noticeably more viscous than that from Examples 4 and 8, respectively. This was due to the much higher molar mass of the devulcanized polymers produced in Examples 13 and 14.

The molar mass of the devulcanized polymer from Example 13 was 18% lower than that of the original green rubber. This result indicates that there may be significant thermal cracking, during reaction at 250° C. for 90 minutes, which degrades the rubber polymers. In contrast, reaction at 200° C. for 60 minutes results in only a very slight apparent reduction in molecular weight.

TABLE 8

Recipe for model tread compound

| Component | PHR |
|---|---|
| Styrenebutdiene Rubber | 70 |
| Polybutadiene rubber | 30 |
| Plasticizier | 20 |
| Stearic acid | 1.5 |
| Zinc oxide | 3 |
| Antidegradant-2 | 0.5 |
| Antidegradant-2 | 1.5 |
| Accelerator-1 | 1 |
| Accelerator-2 | 0.4 |
| Sulphur | 1.8 |
| Total | 129.7 |

TABLE 9

Yields and molar mass from devulcanization of a model
tread compound which contained no carbon black.

| Example | Temperature (° C.) | Reaction Time (minutes) | Polymer Yield (wt. % of volatiles) | Molar Mass (g/mole) |
|---|---|---|---|---|
| 13 | 250 | 90 | 98.9 | 123151 |
| 14 | 200 | 60 | 35.6 | 144966 |
| — | — | — | Green rubber | 150781 |

Using the present methods, devulcanized polymer was obtained at yields of 37 to 86% with respect to estimated polymer content of the used rubber tire crumb. The use of catalyst and hydrogen partial pressure appears to have significantly decreased degradation of the polymer by thermal cracking experienced by other devulcanization processes.

Catalytic devulcanization in accordance with the methodologies described herein was effective in unzipping the sulphur crosslinks in the rubber crumb converting the rubber therein to a mixture of soluble polymers. Due to the high yields obtained in the present case almost no trace of rubber crumb was found at the end of the reaction. The high yield of soluble polymer obtained in the present work was well beyond that obtained at similar temperatures by other devulcanization processes. Compared to other processes, substantively all of the added catalyst and solvent could be recovered for recycling as a result of the high conversion of rubber crumb to soluble polymer.

Catalyst composition, reaction temperature and residence time may be optimized to attain maximal polymer yields and sulphur removal. Other monometallic metal catalysts may also be used to improve yield.

While the devulcanization process described herein is expected to be used primarily for the processing of scrap tires, which is by a significant margin the largest source of vulcanized rubber feedstock, it can be used to reclaim rubber polymer materials from a wide range of vulcanized rubber products. Target applications for the rubber materials produced by the devulcanization process of the present invention include substitution for virgin materials in the manufacture of new vulcanized rubber products such as tires, hoses, belts, mats, bumpers and other shock absorbing components. Of these candidate applications, tires represent both the largest in volume terms and also the most demanding in terms of performance specifications. The reclaimed rubber materials produced by the present invention may also replace virgin rubber polymer materials in polymer modified asphalts, which are used for high performance asphalt paving concrete and a range of construction products such as roofing shingles The above-described embodiments of the present invention are intended to be examples only. Alterations, modifications and variations may be effected to the particular embodiments by those of skill in the art without departing from the scope of the invention, which is defined solely by the claims appended hereto.

REFERENCES

1. Sekhar, B. C., Kormer, V. A., Sotnikova, E. N., Trunova, L. N. and Nikitina, N. A., Reclaiming of elastomeric material, U.S. Pat. No. 5,770,632. Jun. 23, 1998.

2. Mouri, M., Usuki, A. and Sato, N., Process for producing reclaimed rubber or unvulcanized reclaimed rubber, U.S. Pat. No. 5,672,630. Sep. 30, 1997.

3. Nicholas, P. P., Devulcanized rubber composition and process for preparing same, U.S. Pat. No. 4,161,464. Jul. 17, 1979.

4. Straube, G., Straube, E., Neumann, W., Ruckauf, H., and Loffler, M., Method for reprocessing scrap rubber, U.S. Pat. No. 5,275,948. Jan. 4, 1994.

5. Romine, R. A. and Snowden-Swan, L. J., Method for the addition of vulcanized waste rubber to virgin rubber products, U.S. Pat. No. 5,597,851. Jan. 28, 1997.

6. Myers, R. D., Nicholson, P. and Moir, M. E., Rubber devulcanization process, U.S. Pat. No. 5,602,186. Feb. 11, 1997.

7. Myers, R. D. and MacLeod, J. B., Rubber devulcanization process, U.S. Pat. No. 5,798,394. Aug. 25, 1998.

8. Hunt, L. K. and Kovalek, R. R., Devulcanization of cured rubber, U.S. Pat. No. 5,891,926. Apr. 6, 1999.

9. Cyr, T., Lewkowicz, L., Ozum, B., Lott, R. K. and Lee, L.-K., Hydrocracking process involving colloidal catalyst formed in situ, U.S. Pat. No. 5,578,197. Nov. 26, 1996.

10. Wiehe, I. A., Polygon mapping with two-dimensional solubility parameters, Industrial Engineering and Chemistry Research, 34, 661-673, 1995.

What is claimed is:

1. A process for the devulcanization of rubber comprising the steps of:
   a) contacting vulcanized rubber with a rubber-swelling solvent capable of swelling the rubber to form solvent-swollen vulcanized rubber;
   b) heating the solvent-swollen vulcanized rubber in the presence of a hydrogen source to initiate a devulcanization reaction; and,
   c) allowing the devulcanization reaction to proceed for a time sufficient to effectively devulcanize the vulcanized rubber wherein step a) includes contacting vulcanized rubber with a hydrogenation catalyst precursor dissolved in the rubber-swelling solvent to form solvent-swollen vulcanized rubber containing the hydrogenation catalyst precursor; and step b) includes heating the solvent-swollen vulcanized rubber to convert the catalyst precursor to an active catalyst in the presence of the hydrogen source to initiate the devulcanzation reaction.

2. The process of claim 1 wherein the rubber-swelling solvent is selected from any one of or a combination of toluene, o-xylene, p-xylene, dodecane, n-heptane, cyclohexane, tetralin and decalin.

3. The process of claim 1 wherein the rubber-swelling solvent is inert with respect to reaction with the catalyst precursor, active catalyst and vulcanized and devulcanized rubber.

4. The process of claim 1 wherein the solvent provides a source of hydrogen during steps b) and c).

5. The process of claim 1 wherein the catalyst precursor is soluble in the swelling solvent.

6. The process of claim 1 wherein the catalyst precursor is an organometallic compound of a transition metal.

7. The process of claim 1 wherein the catalyst precursor is converted to the active catalyst by reaction with elemental sulphur or organic sulphur compounds within the vulcanized rubber.

8. The process of claim 7 wherein the active catalyst is a transition metal sulphide.

9. The process of claim 1 wherein the catalyst precursor is a organometallic compound, $M$-$R_x$, where M is a transition metal and $R_x$ is an organic ligand having any one of or a combination of a carbonyl, naphthenate, carboxylate, phosphine, amine, nitrosyl, or cyclopentadienyl group.

10. The process of claim 1 wherein the catalyst precursor is molybdenum ethylhexanoate.

11. The process of claim 1 wherein the catalyst precursor is selected from any one of or a combination of molybdenum carbonyl, molybdenum naphthenate, nickel carbonyl, nickel naphthenate, cobalt carbonyl, cobalt naphthenate, iron carbonyl, ruthenium carbonyl, tungsten carbonyl and osmium carbonyl.

12. The process of claim 1 wherein the vulcanized rubber is incubated with the solvent prior to contact with the catalyst precursor.

13. The process of claim 1 wherein the vulcanized rubber is incubated with the swelling solvent for a time sufficient to effect saturation of the swelling solvent and catalyst precursor within the vulcanized rubber.

14. The process of claim 1 wherein in step a) the catalyst precursor is mixed with the swelling-solvent, and the vulcanized rubber is then contacted with the solvent/precursor mixture.

15. The process of claim 1 wherein the process is carried out in a controlled anaerobic, reducing atmosphere.

16. The process of claim 1 wherein the process is carried out within a batch or continuous flow reactor.

17. The process of claim 1 wherein wherein steps b) and c) are performed at a temperature of 50-450° C.

18. The process of claim 1 wherein steps b) and c) are performed at a temperature of 50-250° C.

19. The process of claim 1 wherein the reaction time of steps b) and c) is less than 180 minutes.

20. The process of claim 1 wherein the reaction time of steps b) and c) is less than 90 minutes.

21. The process of claim 1 wherein the hydrogen source is any one of or a combination of hydrogen gas, decalin, tetralin, or a hydroaromatic compound.

22. The process of claim 1 wherein step a) includes adding a sulphiding agent for activating the catalyst precursor.

23. The process of claim 22 wherein the sulphiding agent is dimethyldisulphide.

24. The process of claim 1 further comprising the step of quenching the reaction after step c).

25. The process of claim 24 further comprising the step of separating unreacted vulcanized rubber and carbon black from the devulcanized rubber.

26. The process of claim 1 wherein the molar mass of the devulcanized rubber is controlled by adjustment of the reaction time of step c) and the upper temperature of step b).

27. A process for devulcanizing rubber comprising contacting and heating an amount of vulcanized rubber with an effective amount of a rubber swelling solvent and a hydrogenation catalyst precursor soluble in the solvent.

28. A monophasic devulcanization solution comprising a hydrogenation catalyst precursor and a rubber swelling solvent.

29. A rubber-swelling solvent and an organo-transition metal catalyst precursor in solution for use in the devulcanization of vulcanized rubber in an anaerobic environment in the presence of a hydrogen source.

30. A rubber devulcanization process comprising the steps of:
   a) contacting vulcanized rubber with a mixture of a hydrogenation catalyst precursor and a rubber swelling solvent;
   b) activating the hydrogenation catalyst precursor with heat and a source of sulphur to cause devulcanization in the presence of reactive hydrogen.

31. A rubber devulcanization process comprising the steps of converting a catalyst precursor, $M\text{-}R_x$, where M is a transition metal and $R_x$ is an organic or other ligand capable of coordination with the transition metal in a charged or uncharged state, to an active catalyst by reaction of the catalyst precursor with sulphur within solvent-swollen vulcanized rubber, $R'\text{—}S_z\text{—}R''$, where R' and R" are rubber polymers or rubber polymer additives and $\text{—}S_z\text{—}$ are sulphur crosslinks within the vulcanized rubber and wherein the reaction is carried out in the presence of reactive hydrogen.

* * * * *